United States Patent [19]
Kazami et al.

[11] Patent Number: 5,937,107
[45] Date of Patent: Aug. 10, 1999

[54] THUMBNAIL IMAGE SIGNAL OUTPUT APPARATUS

[75] Inventors: Kazuyuki Kazami, Itabashi-ku; Norikazu Yokonuma, Adachi-ku; Hideo Hibino, Kawasaki; Hisashi Okutsu, Yokohama, all of Japan

[73] Assignee: Nikon Corporation, Tokyo, Japan

[21] Appl. No.: 08/911,916

[22] Filed: Aug. 15, 1997

[30] Foreign Application Priority Data

Aug. 20, 1996 [JP] Japan ................................ 8-218617
Aug. 20, 1996 [JP] Japan ................................ 8-218619
Aug. 27, 1996 [JP] Japan ................................ 8-225078

[51] Int. Cl.$^6$ .............................. G06T 3/40; G06T 3/60; H04N 1/21; H04N 1/393
[52] U.S. Cl. ...................... 382/298; 382/296; 382/305; 358/444; 358/450; 358/451
[58] Field of Search ................................ 382/298, 296, 382/297, 293, 305, 254; 358/444, 448, 450, 451, 452, 527, 528, 537, 531; 355/54; 707/104

[56] References Cited

U.S. PATENT DOCUMENTS

| | | | |
|---|---|---|---|
| 4,965,662 | 10/1990 | Shiota | 358/527 |
| 5,440,401 | 8/1995 | Parulski et al. | 382/305 |
| 5,469,274 | 11/1995 | Iwasaki et al. | 358/450 |
| 5,572,726 | 11/1996 | Hasuo | 382/305 |
| 5,757,467 | 5/1998 | Katakura et al. | 355/54 |

*Primary Examiner*—Scott Rogers
*Attorney, Agent, or Firm*—Oliff & Berridge, PLC

[57] ABSTRACT

The thumbnail image signal output apparatus according to the present invention includes: an image input device which inputs an image; a storage device which stores a plurality of images each of which has been input via the image input device; an image processing device which processes the image which has been input; an update device which updates one of a plurality of images stored in the storage device which corresponds to the image processed by the image processing device to the image after such processing; an image conversion device which converts a plurality of images stored in the storage device into thumbnail images; and an output device which outputs an image signal for displaying converted thumbnail images upon a display device.

18 Claims, 11 Drawing Sheets

THUMBNAIL IMAGE SIGNAL OUTPUT APPARATUS

INCORPORATION BY REFERENCE

The disclosures of the following priority applications are herein incorporated by reference: Japanese Patent Application No. 8-218617 dated Aug. 20, 1996; Japanese Patent Application No. 8-218619 dated Aug. 20, 1996; and Japanese Patent Application No. 8-225078 dated Aug. 27, 1996.

BACKGROUND OF THE INVENTION

1. Field of the Invention

The present invention relates to an apparatus which outputs a thumbnail image signal so as to display a plurality of images at a glance.

2. Description of the Related Art

A thumbnail image display apparatus which reads in a plurality of images of film frames from a photographic film and displays them at a glance upon a monitor screen is per se known. It should be noted that by "thumbnail image" is meant an index image or a table of contents image. With this thumbnail image display apparatus, the images of a plurality of film frames are read in and stored for use for thumbnail image display, and the thumbnail images are displayed as required.

On the other hand, with a full screen display in which the image of a single film frame is displayed as a lone image upon the screen, the image can be inspected or can be processed in various manners such as magnification, shifting, or rotation.

With prior art thumbnail image display apparatuses, even though in full screen display the image may be processed for each film frame by performing magnification or reduction, shifting, rotation and the like, the problem has existed that the details of processing are not precisely represented in the thumbnail images.

SUMMARY OF THE INVENTION

Accordingly, it is an object of the present invention to provide a thumbnail image signal output apparatus which can accurately represent, even in thumbnail image display, the details of processing which has been performed upon the images in full screen display.

In order to attain the above described object, the present invention proposes a thumbnail image signal output apparatus, comprising: an image input device which inputs an image; a storage device which stores a plurality of images each of which has been input via the image input device; an image processing device which processes the image which has been input; an update device which updates one of a plurality of images stored in the storage device which corresponds to the image processed by the image processing device to the image after such processing; an image conversion device which converts a plurality of images stored in the storage device into thumbnail images; and an output device which outputs an image signal for displaying converted thumbnail images upon a display device.

DESCRIPTION OF THE PREFERRED EMBODIMENTS

Preferred Embodiment 1

Figure 1:
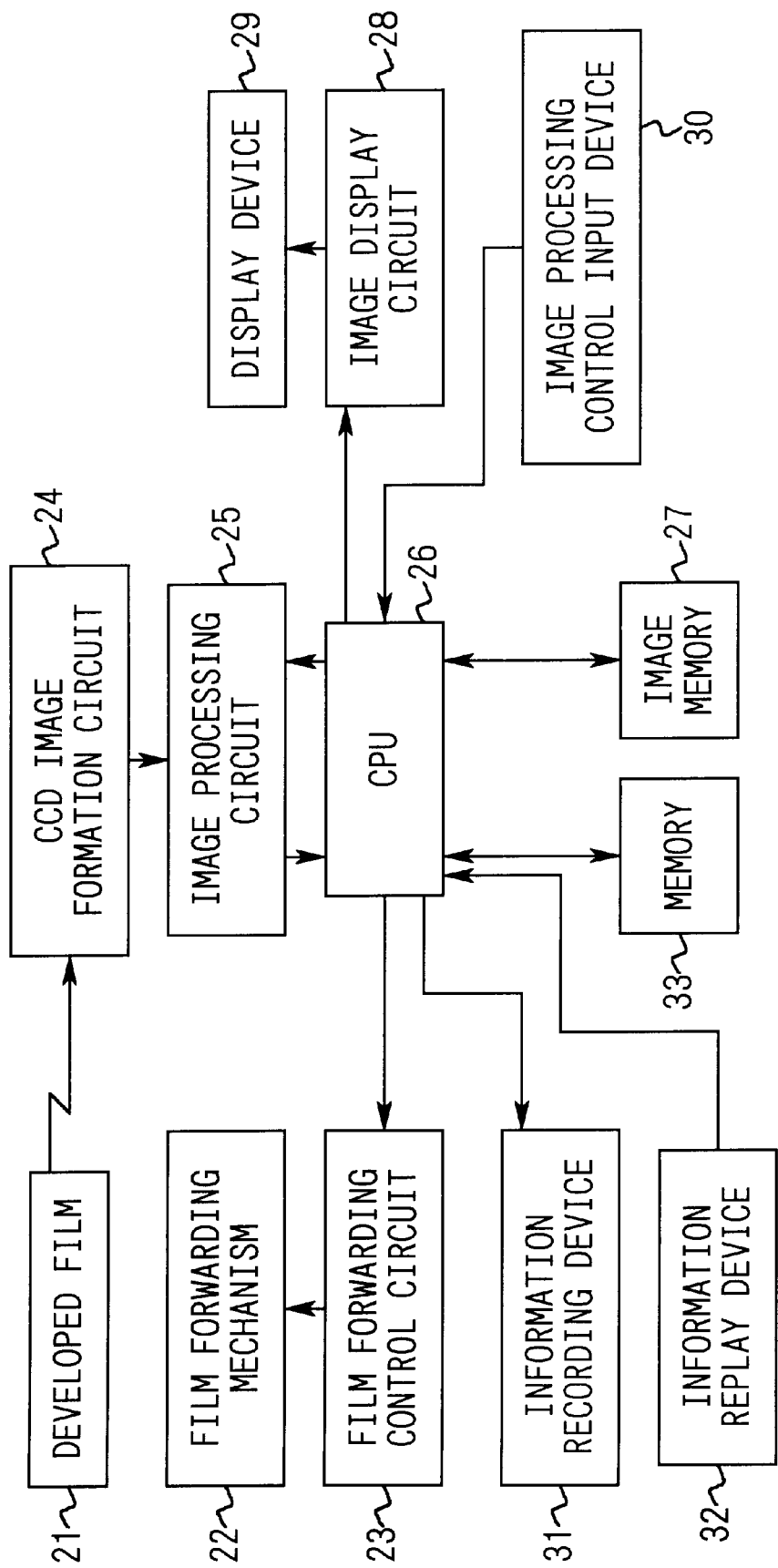
FIG. 1 is a figure showing the overall structure of a first preferred embodiment.

FIG. 1 shows the overall construction of a first preferred embodiment of the present invention which displays images upon a developed photographic film upon a display device. A developed film 21 which has been loaded is forwarded by a film forwarding control circuit 23 and a film forwarding mechanism 22, and an image of each film frame is formed by a CCD image formation circuit 24. The image which has been formed is processed by an image processing circuit 25, and is converted into digital image data and is transmitted to a CPU 26. The CPU 26 successively stores the images which have been thus transferred in an image memory 27.

Figure 11:
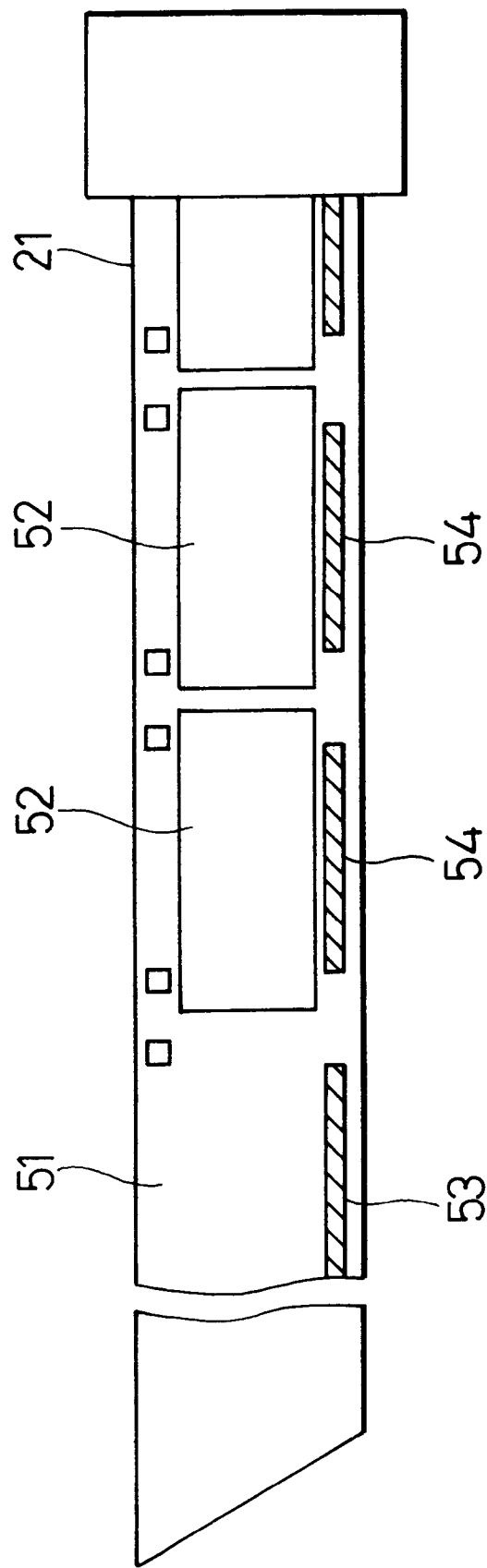
FIG. 11 is a figure showing a film which is provided with magnetic recording sections.

As shown in FIG. 11, upon the film 21 there are formed, for magnetically recording various items of information, a magnetic recording section 53 for a film leader portion 51, and further magnetic recording sections 54 one corresponding to each film frame 52. An information recording device 31 records various types of information which are transmitted from the CPU 26 upon the magnetic recording sections 53 and 54, and an information replay device 32 replays information which is recorded in the magnetic recording regions 53 and 54 and transmits it to the CPU 26.

The CPU 26 performs full screen display by transmitting to an image display circuit 28 the image of a single film frame which has been transmitted from the image processing circuit 25, and thus displaying the image of a single film frame upon the entire screen of a display device 29. Further, the CPU 26 performs thumbnail image display by reading out a plurality of images which have been stored in the image memory 27, converting them into thumbnail images and transmitting them to the image display circuit 28, and thus displaying the images of the plurality of film frames upon the display device 29 all together. In this case, because in the thumbnail image display the images of a plurality of film frames are displayed upon a single screen, the image of each film frame is smaller than its image in full screen display, and is also coarser (lower resolution).

When, while observing the image of a single film frame which is being displayed in full screen on the display device 29, a process such as zooming (magnification or shrinkage), shifting, rotation, or the like of the image is performed via a image processing control input device 30, the CPU 26 updates the corresponding image which is stored in the image memory 27 by overwriting it with the processed image. If a thumbnail image display request is subsequently issued, the image which has thus been updated after processing is converted into a thumbnail image, and is transmitted to the image display circuit 28 so as to be displayed as a thumbnail image upon the display device 29.

Next, the operation of this first preferred embodiment of the present invention will be explained with reference to the flow charts shown in FIGS. 2 through 4.

Figure 2:
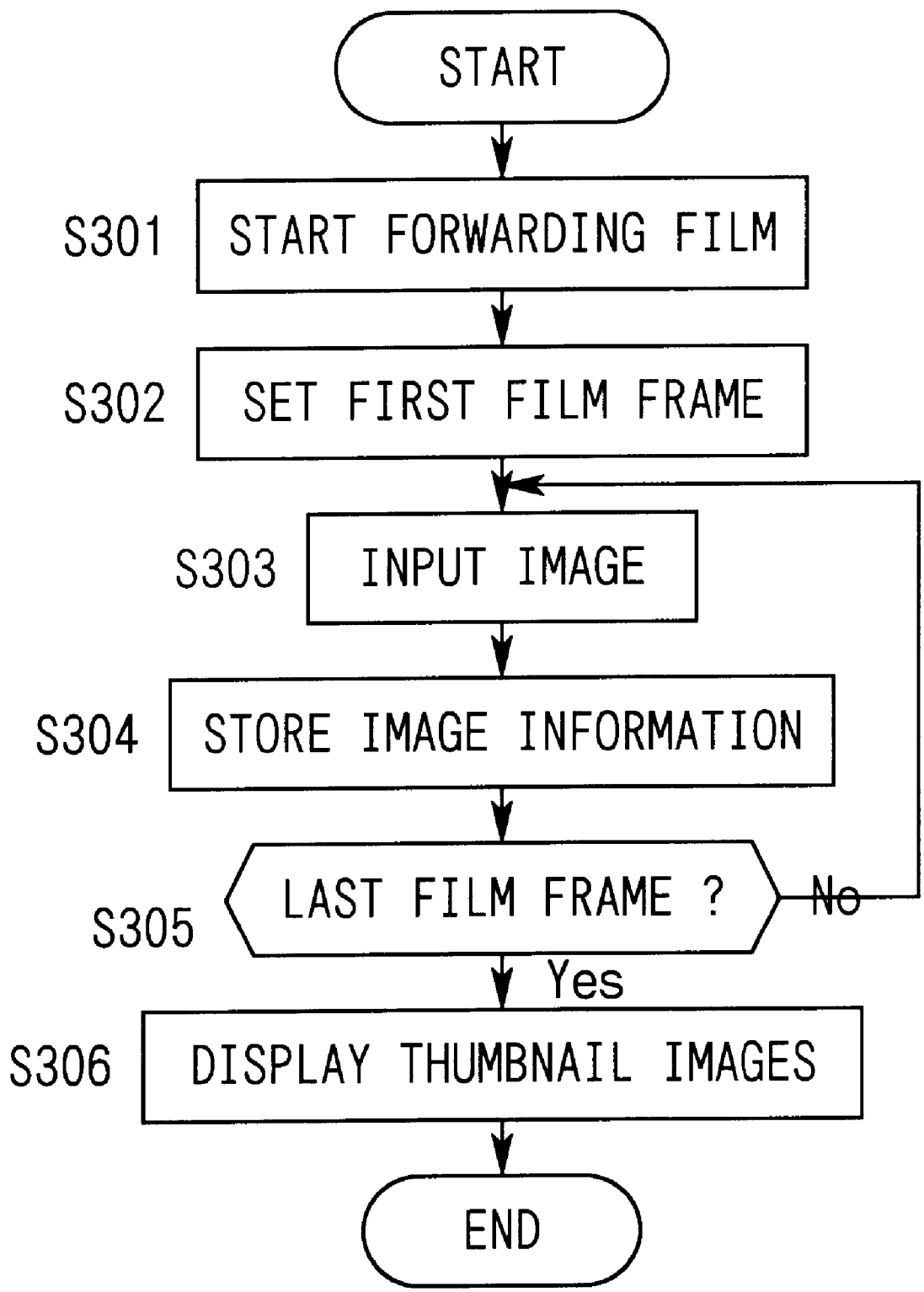
FIG. 2 is a flow chart showing the procedure in this first preferred embodiment for the display of thumbnail images.

FIG. 2 is a flow chart showing the procedure for displaying thumbnail images. In a step S301 the forwarding of the film by a film forwarding circuit 23 and a film forwarding mechanism 22 is started, and next in a step S302 the first film frame is set to a predetermined imaging position for the CCD image formation circuit 24. In a step S303 imaging is performed by the CCD image formation circuit 24, and this image is processed by the image processing circuit 25 and is converted into digital image data. In a step S304, the image is transmitted from the image processing circuit 25 and is stored in the image memory 27. In a step S305, it is determined whether or not the images have been formed and stored as far as the image of the last frame on the film, and if the end of the film has not yet been reached the flow of control returns to the step S303 and the inputting of the image of the next film frame is performed. On the other hand, if the imaging and storage process has proceeded up to and including the last film frame, the flow of control is transferred to a step S306, and a plurality of images which are stored in the image memory 27 are read out and are converted into thumbnail images, and are transmitted to the image display circuit 28 and are displayed as thumbnail images upon the display device 29.

Figure 3:
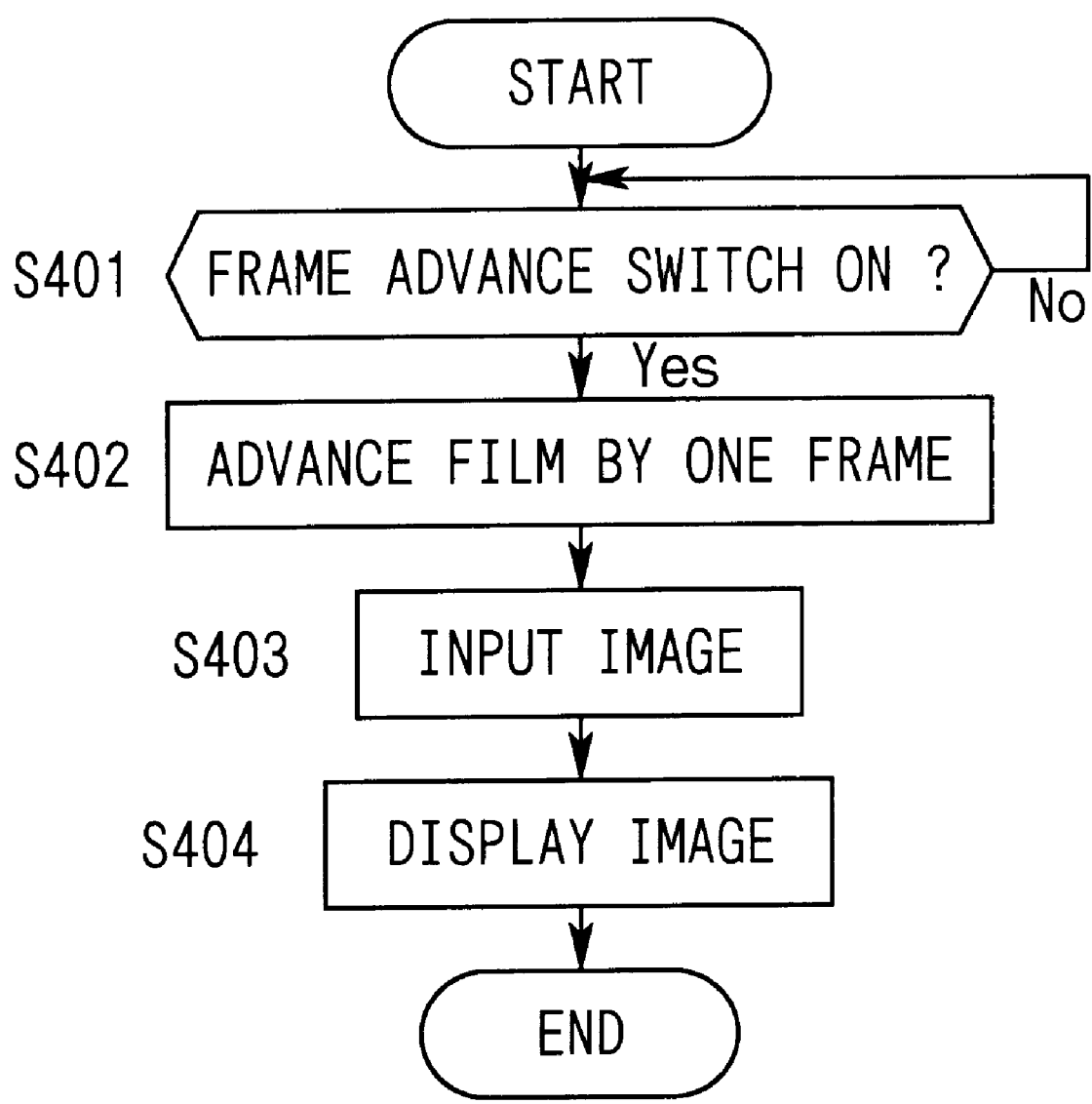
FIG. 3 is a flow chart showing the procedure in this first preferred embodiment for full screen display of the image of each film frame.

FIG. 3 is a flow chart showing the procedure for full screen display of the image of each film frame.

In a step S401 a test is performed as to whether or not a film frame advance switch not shown in the figures is being operated to order film frame advancement, and when film frame advancement is thus being ordered the flow of control proceeds to a step S402. In the step S402 film forwarding by one film frame is performed by the film forwarding control circuit 23 and the film forwarding mechanism 22, and thus the next film frame is set to the predetermined imaging position. Next in a step S403 an image of the film frame which has been set to the imaging position is formed by the CCD image formation circuit 24, and is processed by the image processing circuit 25 so as to be converted into digital image data. In a step S404 this image which has been transmitted from the image processing circuit 25 is transmitted to the image display circuit 28, and is displayed full screen upon the display device 29.

Figure 4:
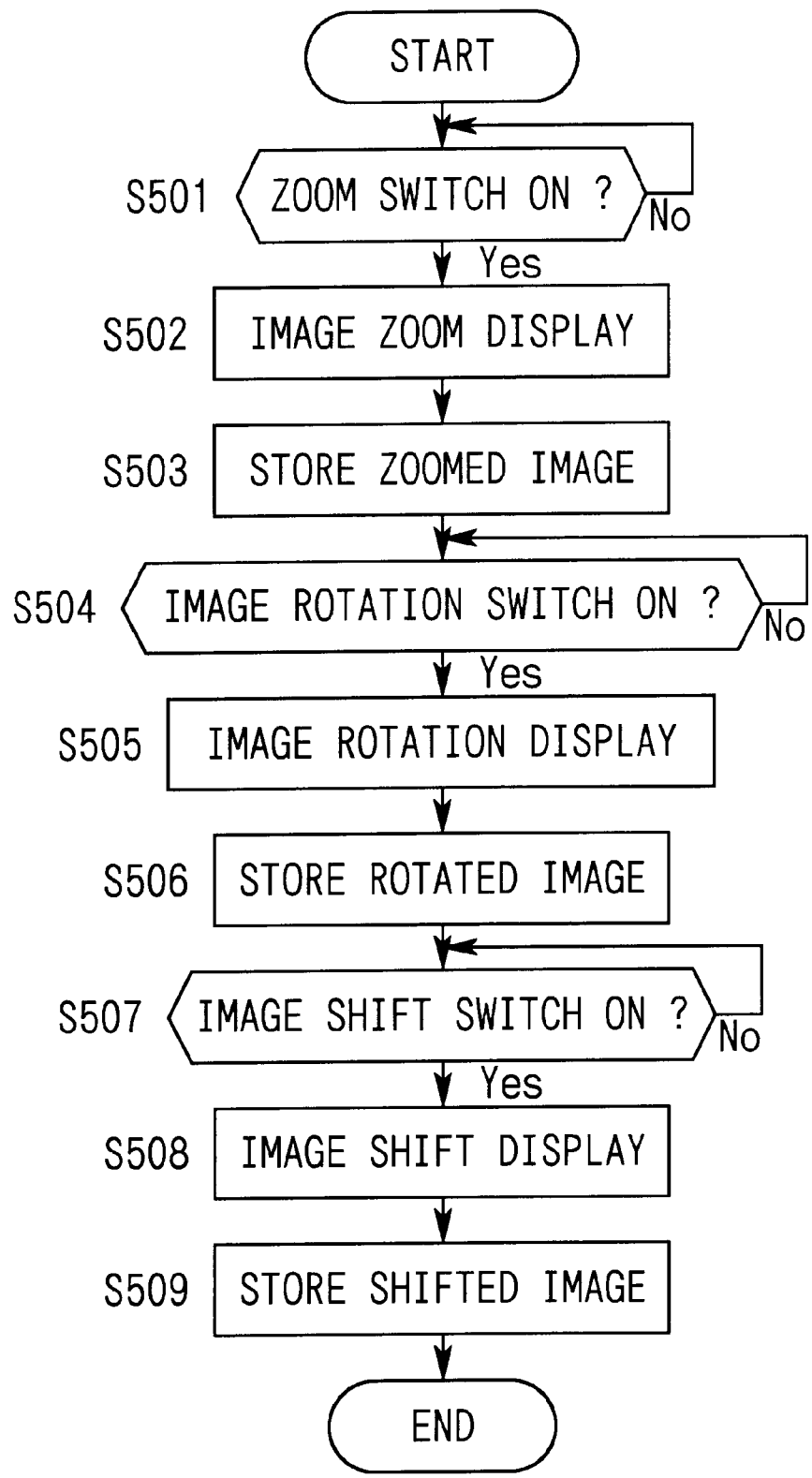
FIG. 4 is a flow chart showing the procedure in this first preferred embodiment for processing an image which has been displayed as full screen.

FIG. 4 is a flow chart showing the procedure for processing an image which has been displayed as full screen.

In a step S501 a test is performed as to whether or not a zoom switch of the image processing control input device 30 is being operated, and if it is being operated then the flow of control proceeds to a step S502, and zoom processing of the image is performed according to this control input. In a step S503, the image of the appropriate film frame which is stored in the image memory 27 is updated with an image which has been magnified or shrunk by zoom processing.

In a step S504 a test is performed as to whether or not a screen rotation switch of the image processing control input device 30 is being operated, and if it is being operated then the flow of control proceeds to a step S505, and rotation processing of the image is performed according to this control input. In a step S506, the image of the appropriate film frame which is stored in the image memory 27 is updated with an image which has been rotated by rotation processing.

In a step S507 a test is performed as to whether or not a screen shift switch of the image processing control input device 30 is being operated, and if it is being operated then the flow of control proceeds to a step S508, and shift processing of the image is performed according to this control input. By shift processing is meant that the center of the image is shifted upon the screen. In a step S509, the image of the appropriate film frame which is stored in the image memory 27 is updated with an image which has been shifted by shift processing.

Since in this manner, when processing such as magnification or shrinkage, rotation, shifting or the like is performed for an image which is being displayed in full screen display upon the display device 29, the image of the appropriate film frame which is stored in the image memory 27 is replaced by the image after processing, accordingly, when the next thumbnail image display is performed, this image after processing which is stored in the image memory 27 is displayed. Accordingly the details of the images after processing are shown in the thumbnail image display, and thumbnail images for each film frame are displayed in the state which is desired by the user.

Preferred Embodiment 2

The construction of the second preferred embodiment is identical to that of the first preferred embodiment as shown in FIG. 1. In the following explanation the aspects in which the function and operation of this second preferred embodiment differ from that of the first preferred embodiment will be described.

The magnetic recording sections 54 (see FIG. 11) are formed upon the film 21 for magnetically recording various types of information, and in this second preferred embodiment image processing information and the like, described hereinafter, is recorded for each film frame. It should be noted that the recording medium for various types of information such as image processing information is not limited to being these magnetic recording sections 54 upon the film for each film frame, but could for example be the magnetic recording section 53 on the film leader portion, or could be a magnetic recording section (not shown in the figures) formed upon the film cartridge.

When the image of a film frame which is being displayed upon the display device 29 in full screen display is, while being observed by the operator, subjected via the image processing control input device 30 to image processing such as zooming (magnification or shrinkage), shifting, rotation or the like, the CPU 26, along with overwriting the appropriate image which is stored in the image memory 27 with the processed image, also records the image processing information upon the magnetic recording section 54 for the appropriate film frame via the information recording device 31. When subsequently a request is made for the display of thumbnail images, the processing information which is magnetically recorded for each film frame is replayed by the information replay device 32, and the image is processed and thumbnail image display is performed according to this image processing information.

Next, the operation of this second preferred embodiment of the present invention will be explained with reference to the flow charts shown in FIGS. 5 through 7.

Figure 5:
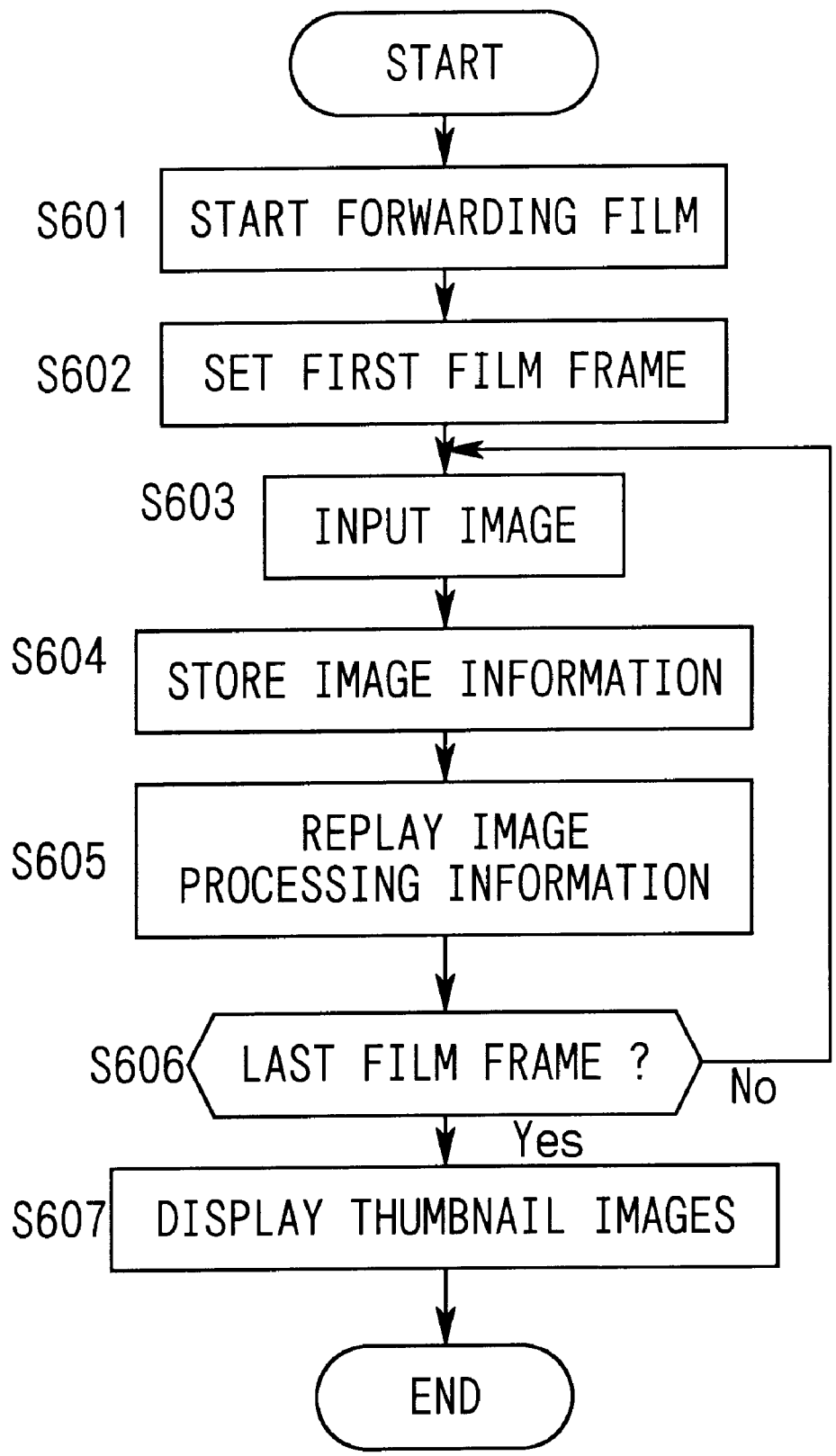
FIG. 5 is a flow chart showing the procedure in a second preferred embodiment for the display of thumbnail images.

FIG. 5 is a flow chart showing the procedure for displaying thumbnail images in this second preferred embodiment.

In a step S601 the forwarding of the film by the film forwarding circuit 23 and the film forwarding mechanism 22 is started, and next in a step S602 the first film frame is set to a predetermined imaging position for the CCD image formation circuit 24. In a step S603 imaging is performed by the CCD image formation circuit 24, and this image is processed by the image processing circuit 25 and is converted into digital image data. And in a step S604 the image is transmitted from the image processing circuit 25 and is stored in the image memory 27.

In a step S605, the image processing information for the first film frame which is magnetically recorded upon the film 21 is replayed by the information replay device 32, and is stored in a memory 33 of the CPU 26. Next in a step S606 it is determined whether or not, along with forming and storing the images, the image processing information has been replayed as far as the image of the last frame on the film, and if the end of the film has not yet been reached the flow of control returns to the step S603 and the inputting of the image of the next film frame and the replaying of its image processing information is performed.

On the other hand, if the inputting of the images and the replaying of the image processing information has proceeded up to and including the last film frame, then the flow of control is transferred to a step S607, and a plurality of images which are stored in the image memory 27 are read out and are converted into thumbnail images, and are transmitted to the image display circuit 28 and are displayed as thumbnail images upon the display device 29. At this time, for those film frames for which image processing information is recorded, the images are converted into thumbnail images and are displayed after having been processed according to this image processing information.

Figure 6:
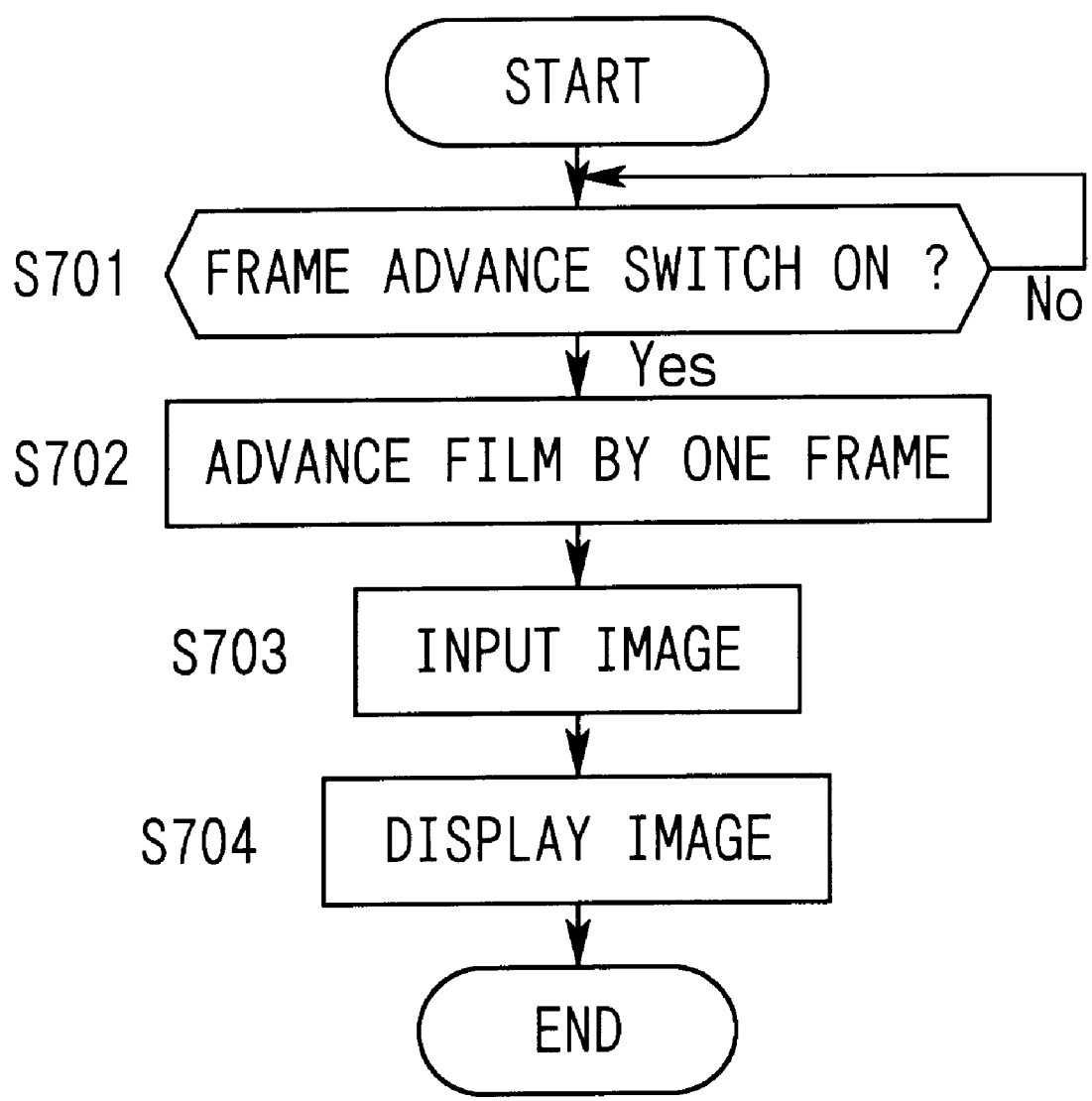
FIG. 6 is a flow chart showing the procedure in this second preferred embodiment for full screen display of the image of each film frame.

FIG. 6 is a flow chart showing the procedure for full screen display of the image of each film frame. Since the operation of each of the steps of FIG. 6 is identical to that of the corresponding step in FIG. 3 for the first preferred embodiment, the explanation thereof will be omitted.

Figure 7:
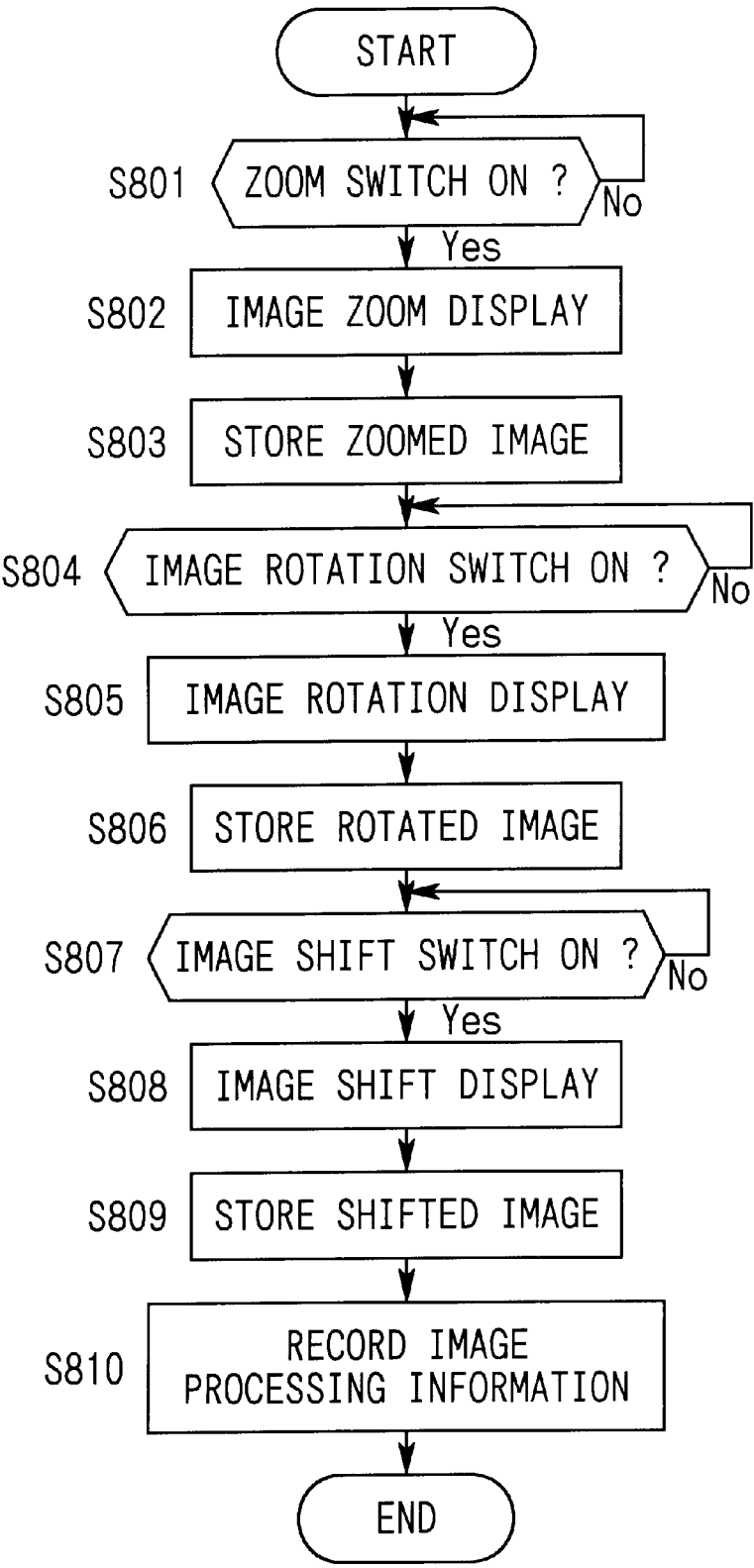
FIG. 7 is a flow chart showing the procedure in this second preferred embodiment for processing an image which has been displayed as full screen.

FIG. 7 is a flow chart showing the procedure for processing an image which has been displayed as full screen. The steps S801 through S809 of this flow chart are the same as the steps S501 through S509 of FIG. 4 for the first preferred embodiment, and accordingly the explanation thereof will be omitted.

In a step S810, the information relating to processing such as zooming (magnification or shrinkage), shifting, rotation or the like which has been performed upon the image by the image processing control input device 30 is recorded by the information recording device 31 upon the magnetic recording section 54 for the appropriate film frame of the film 21.

Since in this manner, when processing such as magnification or shrinkage, rotation, shifting or the like is performed for an image which is being displayed in full screen display upon the display device 29, the image processing information is magnetically recorded upon the film, accordingly, when the next thumbnail image display is performed, the images are displayed as thumbnails after being processed according to the thus recorded image processing information for each film frame. Accordingly the details of the images after processing are shown in the thumbnail image display, and thumbnail images for each film frame are displayed in the state which is desired by the user. This second preferred embodiment is specially effective when the images upon a particular film are again read into the apparatus after the power supply to the apparatus has been turned off, or after another film has been replayed.

Preferred Embodiment 3

The construction of the second preferred embodiment is identical to that of the first preferred embodiment as shown in FIG. 1. In the following explanation the aspects in which the function and operation of this second preferred embodiment differ from that of the first preferred embodiment will be described.

When the image of a film frame which is being displayed upon the display device 29 in full screen display is, while being observed by the operator, subjected via the image processing control input device 30 to image processing such as zooming (magnification or shrinkage), shifting, rotation or the like, the CPU 26, along with storing the image processing information in the memory 33, also generates identification information which specifies the film 21 which is currently loaded, and records it magnetically via the information recording device 31 upon the magnetic recording section 53 or the magnetic recording sections 54 of the film 21.

When a request is made for the display of thumbnail images, along with inputting the images from the film 21, the identification information is replayed by the information replay device 32, the image processing information which corresponds to this identification information is read out from the memory 33 of the CPU 26, and the images which have been input are processed according to this image processing information and thumbnail image display is performed.

Figure 8:
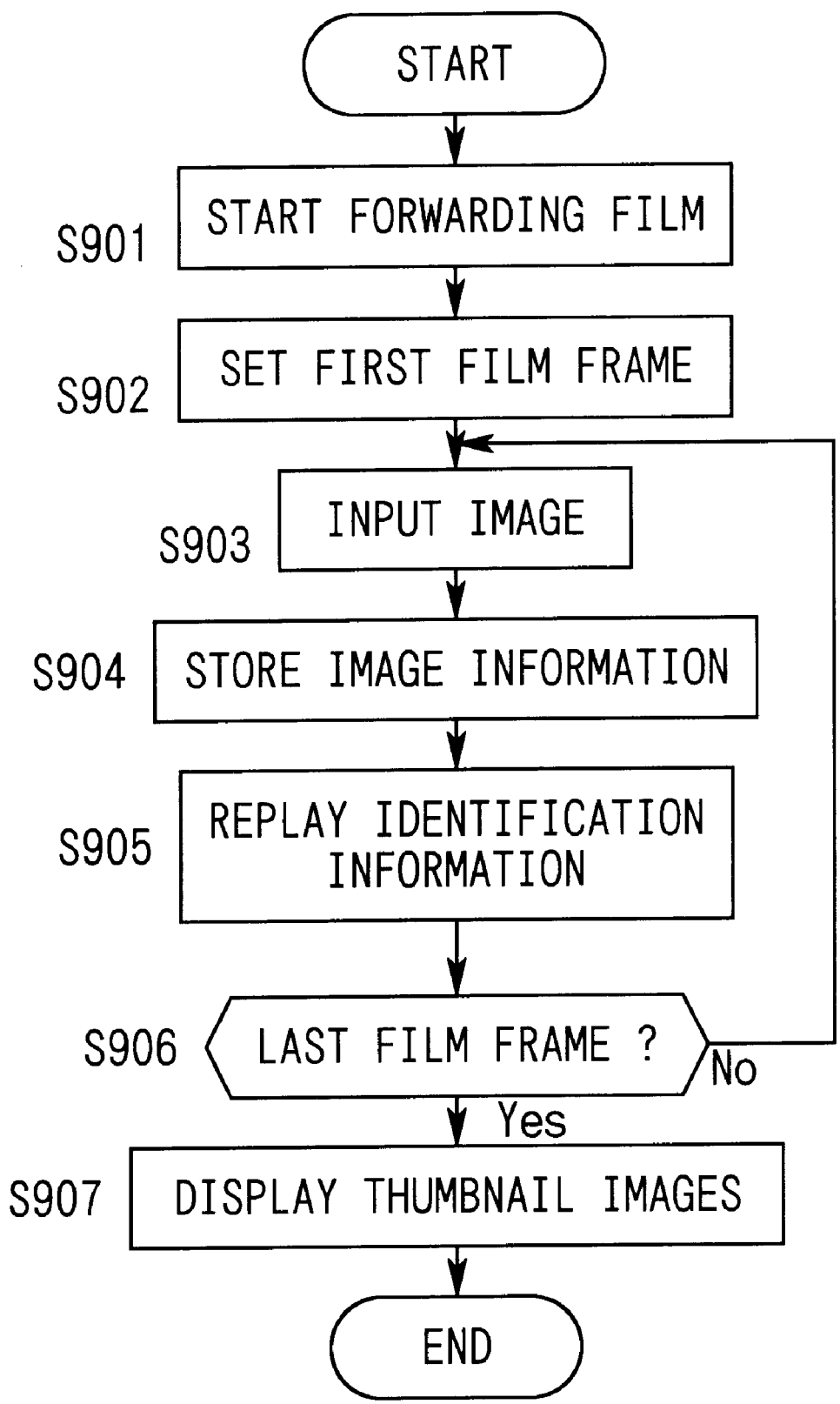
FIG. 8 is a flow chart showing the procedure in a third preferred embodiment for the display of thumbnail images.

Next, the operation of this third preferred embodiment of the present invention will be explained with reference to the flow charts shown in FIGS. 8 through 10. FIG. 8 is a flow chart showing the procedure for displaying thumbnail images in this third preferred embodiment. In a step S901 the forwarding of the film by the film forwarding circuit 23 and the film forwarding mechanism 22 is started, and next in a step S902 the first film frame is set to a predetermined imaging position for the CCD image formation circuit 24. In a step S903 imaging is performed by the CCD image formation circuit 24, and this image is processed by the image processing circuit 25 and is converted into digital image data. And in a step S904 the image is transmitted from the image processing circuit 25 and is stored in the image memory 27.

In a step S905, the identification information which is recorded upon the film 21 is replayed by the information replay device 32. Next in a step S906 it is determined whether or not the imaging of the film frames has proceeded as far as the last frame on the film, and if the end of the film has not yet been reached the flow of control returns to the step S903 and the inputting of the image of the next film frame is performed.

On the other hand, if the inputting of the images has proceeded up to and including the last film frame, then the flow of control is transferred to a step S907, and the image processing information stored in the memory 33 of the CPU 26 which corresponds to the identification information is read out, and a plurality of images which are stored in the image memory 27 are processed according to the image processing information. Further, when these images have been processed, they are converted into thumbnail images and are transmitted to the image display circuit 28, so as to be displayed as thumbnail images upon the display device 29.

Figure 9:
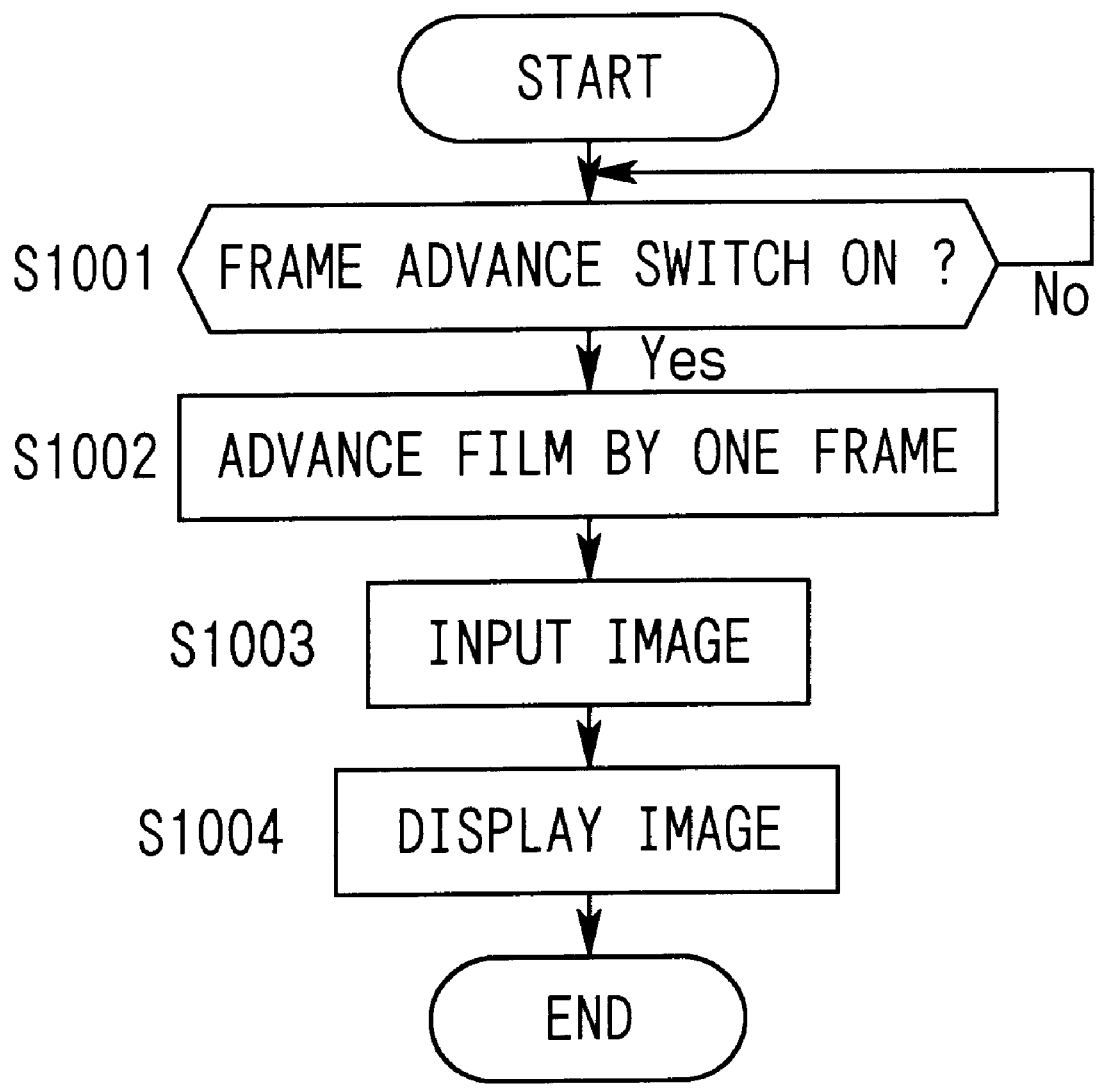
FIG. 9 is a flow chart showing the procedure in this third preferred embodiment for full screen display of the image of each film frame.

FIG. 9 is a flow chart showing the procedure for full screen display of the image of each film frame. Since the operation of each of the steps of FIG. 9 is identical to that of the corresponding step in FIG. 3 for the first preferred embodiment, the explanation thereof will be omitted.

Figure 10:
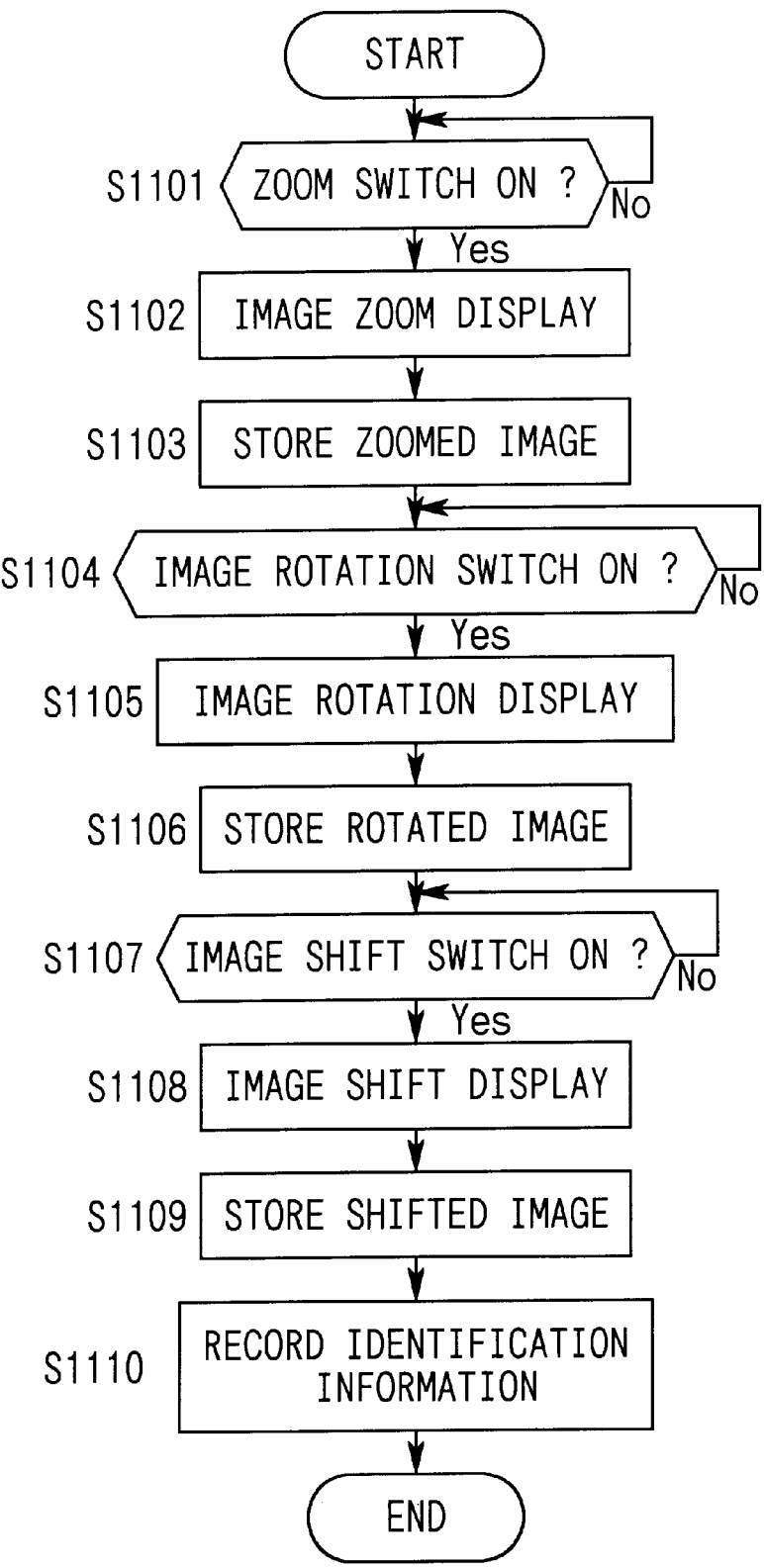
FIG. 10 is a flow chart showing the procedure in this third preferred embodiment for processing an image which has been displayed as full screen.

FIG. 10 is a flow chart showing the procedure for processing an image which has been displayed as full screen. The steps S1101 through S1109 of this flow chart are the same as the steps S501 through S509 of FIG. 4 for the first preferred embodiment, and accordingly the explanation thereof will be omitted.

In a step S1110, identification information which specifies the film which is currently loaded is generated, and this identification information is stored in the memory 33 of the CPU 26 along with the information relating to processing such as zooming (magnification or shrinkage), shifting, rotation or the like which has been performed upon the image by the image processing control input device 30. Further, this identification information is recorded upon the film 21 by the information recording device 31.

Since in this manner the image processing information is recorded in the memory 33 of the apparatus, and only the identification information is recorded upon the film 21, accordingly it is possible to record image processing information without being limited by the information recording capacity of the film 21. Accordingly it is possible to obtain the same beneficial results as in the case of the second preferred embodiment described above, without severely occupying the recording capacity upon the film for storage of image processing information.

It should be noted that, although in the above case the recording of the identification information upon the film was performed in the magnetic recording sections 53 and/or 54, the recording form is not limited to the one described above. For example, it would be acceptable to provide a magnetic recording portion (not shown in the figures) formed upon the film cartridge. Or, alternatively, it would be possible to employ various different forms of recording upon and replay from the film, such as optical recording or the like. Further, it would be possible to take advantage of identification information assigned by the maker of the film during manufacture, such as a cartridge ID or a film ID or the like. Film ID is optically or magnetically recorded upon the film, while cartridge ID is recorded as bar code, character information or the like upon the cartridge surface or upon a cartridge data disk.

What is claimed is:

1. A thumbnail image signal output apparatus, comprising:

an image input device which inputs an image;
   a storage device which stores a plurality of images each of which has been input via said image input device;
   an image processing device which processes the image which has been input;
   an update device which updates one of a plurality of images stored in said storage device which corresponds to the image processed by said image processing device to the image after such processing;
   an image conversion device which converts a plurality of images stored in said storage device into thumbnail images; and
   an output device which outputs an image signal for displaying converted thumbnail images upon a display device.

2. A thumbnail image signal output apparatus according to claim 1, wherein said image processing device processes the image so as to magnify or shrink it.

3. A thumbnail image signal output apparatus according to claim 1, wherein said image processing device processes the image so as to rotate it.

4. A thumbnail image signal output apparatus according to claim 1, wherein said image processing device processes the image so as to shift it.

5. A thumbnail image signal output apparatus according to claim 1, wherein said image input device inputs an image from a developed film.

6. A thumbnail image signal output apparatus, comprising:

an image input device which inputs an image;
   an information replay device which replays image processing information from a recording medium upon which the image processing information has been recorded;
   an image conversion device which processes the image which has been input via said image input device according to the image processing information which has been replayed by said information replay device, and converts the processed image into a thumbnail image; and
   an output device which outputs an image signal for displaying converted one or more thumbnail images upon a display device.

7. A thumbnail image signal output apparatus according to claim 6, further comprising:

an image processing device which processes the image which has been input; and
   an information recording device which records the processing information for the image which has been processed by said image processing device upon the recording medium.

8. A thumbnail image signal output apparatus according to claim 6, wherein said image input device inputs an image from a developed film.

9. A thumbnail image signal output apparatus according to claim 7, wherein said image processing device processes the image so as to magnify or shrink it.

10. A thumbnail image signal output apparatus according to claim 7, wherein said image processing device processes the image so as to rotate it.

11. A thumbnail image signal output apparatus according to claim 7, wherein said image processing device processes the image so as to shift it.

12. A thumbnail image signal output apparatus according to claim 7, wherein:

said image input device inputs an image from a developed film;
   said information replay device replays the image processing information which has been magnetically recorded upon the film; and
   said information recording apparatus magnetically records the image processing information upon the film.

13. A thumbnail image signal output apparatus comprising:

an image input device which inputs an image from a recording medium upon which the image has been recorded;
   an information replay device which replays identification information which has been recorded upon the recording medium;
   a storage device which stores image processing information so as to recognize correspondence with the identification information recorded upon the recording medium;
   an image conversion device which reads out from said storage device the image processing information which corresponds to the identification information recorded on the recording medium from which the image has been input by said image input device, processes the image which have been input from the recording medium according to this image processing information, and converts the processed image into a thumbnail image; and an output device which outputs an image signal for displaying converted one or more thumbnail images upon a display device.

14. A thumbnail image signal output apparatus according to claim 13, further comprising:

an image processing device which processes the image; and an information recording device which records the identification information upon the recording medium, wherein said storage device stores the image processing information for the image which has been processed by said image processing device, the image processing information being able to recognize correspondence with the identification information for the recording medium which has been recorded by said information recording device.

15. A thumbnail image signal output apparatus according to claim 13, wherein said image input device inputs an image from the recording medium which is a developed film.

16. A thumbnail image signal output apparatus according to claim 14, wherein said image processing device processes the image so as to magnify or shrink it.

17. A thumbnail image signal output apparatus according to claim 14, wherein said image processing device processes the image so as to rotate it.

18. A thumbnail image signal output apparatus according to claim 14, wherein said image processing device processes the image so as to shift it.

* * * * *